(12) United States Patent
Desloge

(10) Patent No.: US 12,549,916 B2
(45) Date of Patent: Feb. 10, 2026

(54) AUTOMATIC CALIBRATION OF MICROPHONE ARRAY FOR TELEPRESENCE CONFERENCING

(71) Applicant: GOOGLE LLC, Mountain View, CA (US)

(72) Inventor: Joseph Desloge, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 251 days.

(21) Appl. No.: 18/249,924

(22) PCT Filed: Oct. 30, 2020

(86) PCT No.: PCT/US2020/070723
§ 371 (c)(1),
(2) Date: Apr. 20, 2023

(87) PCT Pub. No.: WO2022/093295
PCT Pub. Date: May 5, 2022

(65) Prior Publication Data
US 2024/0007810 A1 Jan. 4, 2024

(51) Int. Cl.
*H04R 29/00* (2006.01)
*H04R 1/40* (2006.01)
(Continued)

(52) U.S. Cl.
CPC .......... *H04R 29/005* (2013.01); *H04R 1/403* (2013.01); *H04R 1/406* (2013.01); *H04R 3/005* (2013.01); *H04R 3/12* (2013.01); *H04R 29/002* (2013.01)

(58) Field of Classification Search
CPC .... H04R 29/00; H04R 29/002; H04R 29/005; H04R 3/12; H04S 7/301; H04S 7/305
See application file for complete search history.

(56) References Cited

U.S. PATENT DOCUMENTS 8,369,536 B2 * 2/2013 Kim .................... H04S 7/30
381/89
10,080,088 B1 * 9/2018 Yang ................... H04S 7/30
(Continued)

FOREIGN PATENT DOCUMENTS

| CN | 1419795 A | 5/2003 |
| JP | 2008164747 A | 7/2008 |
| JP | 2010232717 A | 10/2010 |

OTHER PUBLICATIONS

International Search Report and Written Opinion for PCT Application No. PCT/US2020/070723, mailed on Jun. 25, 2021, 10 pages.

*Primary Examiner* — Disler Paul
(74) *Attorney, Agent, or Firm* — Brake Hughes Bellermann LLP

(57) ABSTRACT

Techniques of calibrating microphones and loudspeakers in a telepresence system includes generating calibration filters for microphones and/or speakers by deriving power spectral densities at each microphone from each loudspeaker. For example, a computer within an improved telepresence system can measure a raw impulse response function corresponding to each channel, i.e., each loudspeaker/microphone pair. The computer then extracts a sub-segment of each impulse response function between a start and finish time. The computer then generates a white-noise power spectral density for each channel based on the sub-segments. The calibration function for a microphone is then based on a reciprocal of the power spectral density averaged over the loudspeakers. The calibration function for a loudspeaker is then based on a reciprocal of the power spectral density averaged over the microphones.

21 Claims, 12 Drawing Sheets

(51) Int. Cl.
*H04R 3/00* (2006.01)
*H04R 3/12* (2006.01)

(56) References Cited

U.S. PATENT DOCUMENTS

| | | |
|---|---|---|
| 10,735,887 B1 | 8/2020 | Mcelveen et al. |
| 10,765,399 B2 * | 9/2020 | Emmanouilidou .... A61B 7/026 |
| 11,217,264 B1 * | 1/2022 | Yang ........................ G10L 25/51 |
| 11,218,827 B2 * | 1/2022 | McPherson ............ H04R 27/00 |
| 11,516,614 B2 * | 11/2022 | Lee .......................... H04S 3/008 |
| 11,624,804 B2 * | 4/2023 | Davis ........................ G01S 5/24 |
| | | 367/99 |
| 2001/0038702 A1 | 11/2001 | Lavoie et al. |
| 2007/0088544 A1 | 4/2007 | Acero et al. |
| 2008/0192946 A1 | 8/2008 | Faller |
| 2013/0170666 A1 | 7/2013 | Ng et al. |
| 2015/0049583 A1 | 2/2015 | Neal et al. |
| 2017/0127206 A1 | 5/2017 | Skovenborg |
| 2021/0092548 A1 | 3/2021 | Mcelveen et al. |

* cited by examiner

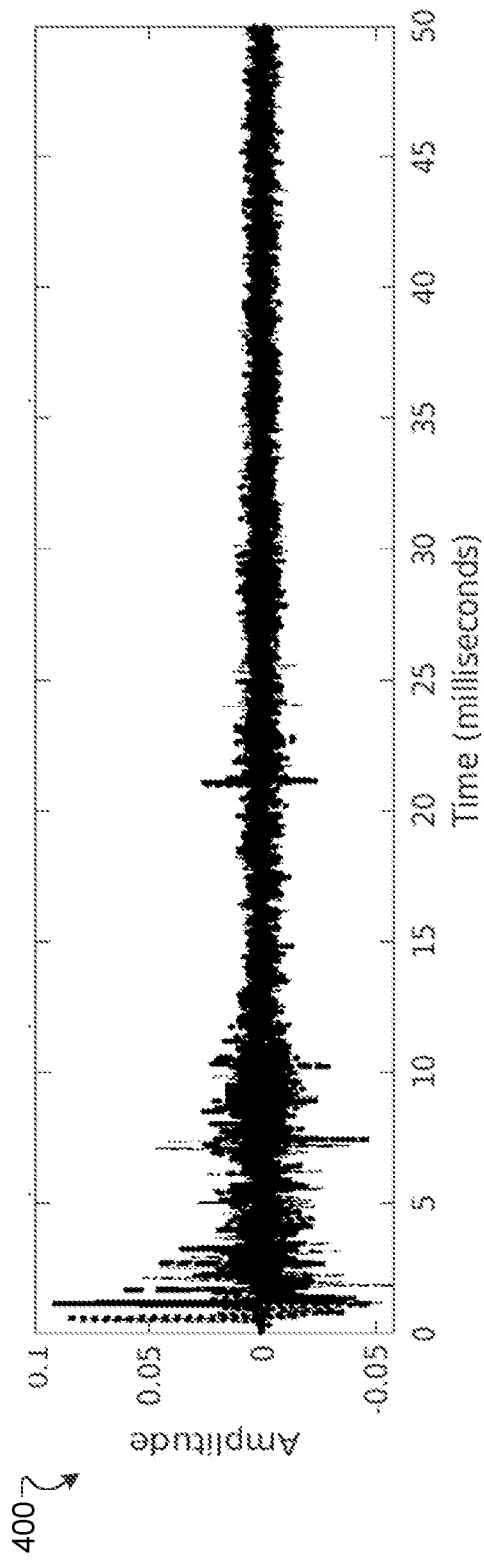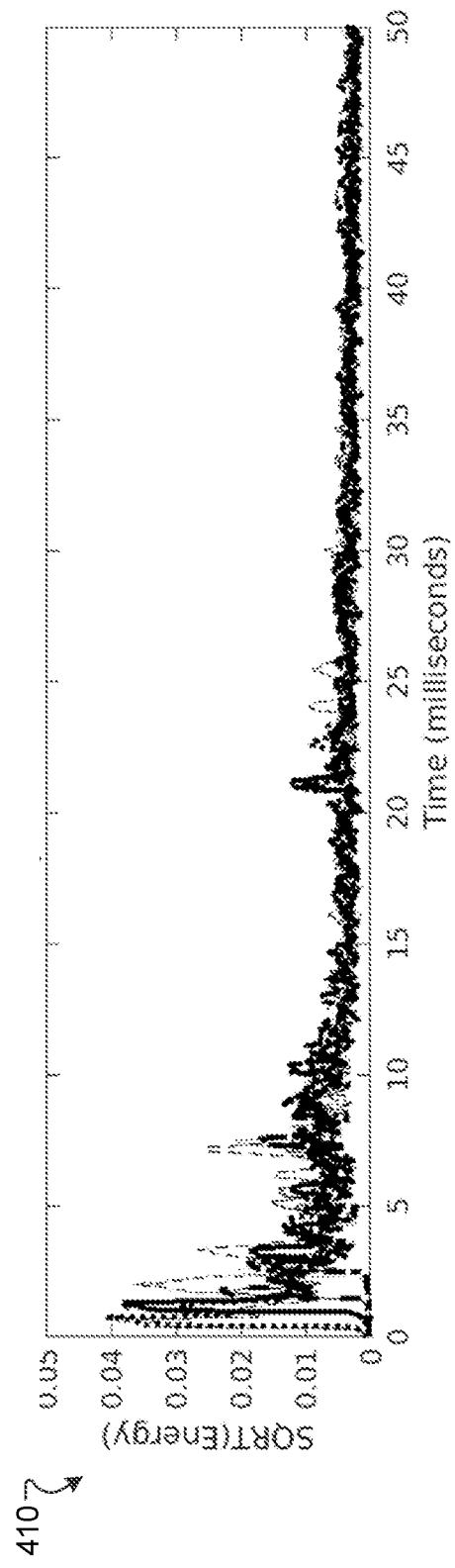
FIG. 4A
FIG. 4B

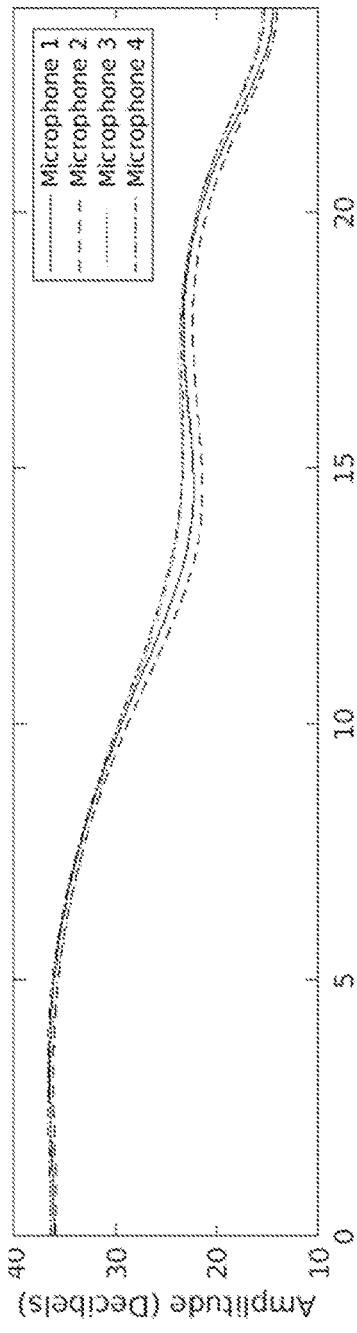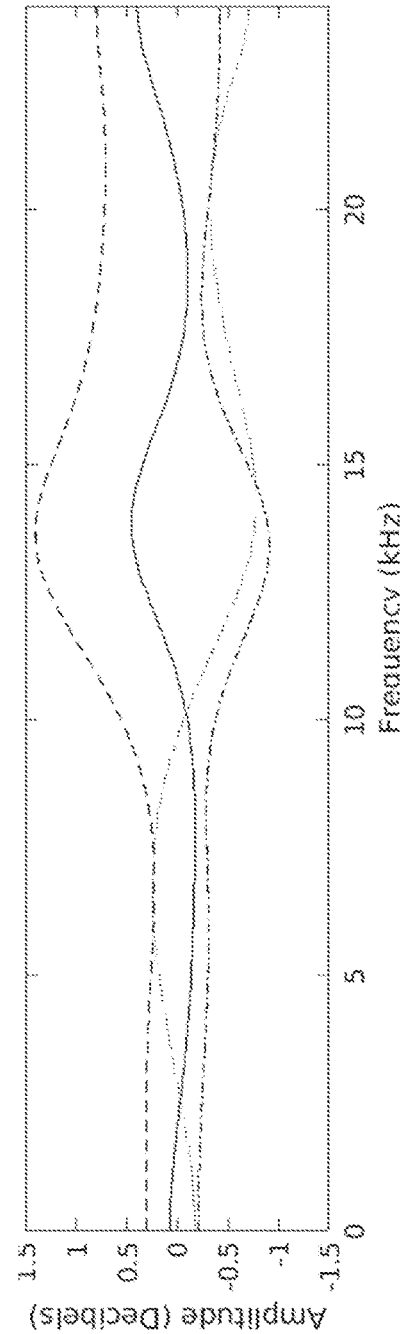

AUTOMATIC CALIBRATION OF MICROPHONE ARRAY FOR TELEPRESENCE CONFERENCING

CROSS REFERENCE TO RELATED APPLICATION

This application is a 35 U.S.C. § 371 National Phase Entry Application from PCT/US2020/070723, filed Oct. 30, 2020, designating the U.S., the disclosure of which is incorporated herein by reference in its entirety.

TECHNICAL FIELD

This description relates to calibration of microphones and loudspeakers used in applications such as telepresence conferencing.

BACKGROUND

A telepresence conferencing system can include a large number of microphones to detect directional audio signals from a user and a plurality of loudspeakers to provide directional audio signals to the user.

SUMMARY

In one general aspect, a method can include receiving, via each microphone of an array of microphones, a reverberant sound field based on an audio signal generated by each loudspeaker of an array of loudspeakers. The method can also include generating, for each microphone of the array of microphones and each loudspeaker of the array of loudspeakers, a respective power-spectral density for that microphone and that loudspeaker based on the respective reverberant sound field generated by that loudspeaker and received at that microphone. The method can further include generating, for each microphone of the array of microphones, a respective calibration filter as a ratio of the power spectral density averaged over the array of loudspeakers and the array of microphones and a power spectral density averaged over the array of loudspeakers. The method can further include recording an acoustic signal from a user by the array of microphones using the respective calibration filter generated for each of the array of microphones, each of the array of microphones using the respective calibration filter recording essentially the same spectrum of the acoustic signal.

In another general aspect, a computer program product comprising a nontransitive storage medium, the computer program product including code that, when executed by processing circuitry of a computing device, causes the processing circuitry to perform a method. The method can include receiving, via each microphone of an array of microphones, a reverberant sound field based on an audio signal generated by each loudspeaker of an array of loudspeakers. The method can also include generating, for each microphone of the array of microphones and each loudspeaker of the array of loudspeakers, a respective power-spectral density for that microphone and that loudspeaker based on the respective reverberant sound field generated by that loudspeaker and received at that microphone. The method can further include generating, for each microphone of the array of microphones, a respective calibration filter as a ratio of the power spectral density averaged over the array of loudspeakers and the array of microphones and a power spectral density averaged over the array of loudspeakers. The method can further include recording an acoustic signal from a user by the array of microphones using the respective calibration filter generated for each of the array of microphones, each of the array of microphones using the respective calibration filter recording essentially the same spectrum of the acoustic signal.

In another general aspect, an electronic apparatus comprises memory and controlling circuitry coupled to the memory. The controlling circuitry can be configured to receive, via each microphone of an array of microphones, a reverberant sound field based on an audio signal generated by each loudspeaker of an array of loudspeakers. The controlling circuitry can also be configured to generate, for each microphone of the array of microphones and each loudspeaker of the array of loudspeakers, a respective power-spectral density for that microphone and that loudspeaker based on the respective reverberant sound field generated by that loudspeaker and received at that microphone. The controlling circuitry can further be configured to generate, for each microphone of the array of microphones, a respective calibration filter as a ratio of the power spectral density averaged over the array of loudspeakers and the array of microphones and a power spectral density averaged over the array of loudspeakers. The controlling circuitry can further be configured to record an acoustic signal from a user by the array of microphones using the respective calibration filter generated for each of the array of microphones, each of the array of microphones using the respective calibration filter recording essentially the same spectrum of the acoustic signal.

In another general aspect, a method can include receiving, via each microphone of an array of microphones, a reverberant sound field based on an audio signal generated by each loudspeaker of an array of loudspeakers. The method can also include generating, for each microphone of the array of microphones and each loudspeaker of the array of loudspeakers, a respective power-spectral density for that microphone and that loudspeaker based on the respective reverberant sound field generated by that loudspeaker and received at that microphone. The method can further include generating, for each microphone of the array of microphones, a respective calibration filter as a ratio of the power spectral density averaged over the array of loudspeakers and the array of microphones and a power spectral density averaged over the array of loudspeakers. The method can further include producing an acoustic signal by the array of loudspeakers using the respective calibration filter generated for each loudspeaker of the array of loudspeakers, each of the array of loudspeakers using the respective calibration filter producing essentially the same spectrum of the acoustic signal in response to the same output stimulus.

The details of one or more implementations are set forth in the accompanying drawings and the description below. Other features will be apparent from the description and drawings, and from the claims.

BRIEF DESCRIPTION OF THE DRAWINGS

FIG. 4A is a plot that illustrates an example raw impulse response function from two loudspeakers to four microphones within the electronic environment shown in FIG. 1A.

FIG. 4B is a plot that illustrates an example time-dependent energy metric associated with the raw impulse response function from FIG. 4A.

FIG. 4H is a plot that illustrates example power spectral densities from FIG. 4G, averaged over loudspeakers.

FIG. 4I is a plot that illustrates example microphone calibration filters derived from the loudspeaker-averaged power spectral densities in FIG. 4H.

DETAILED DESCRIPTION

Figure 1A:
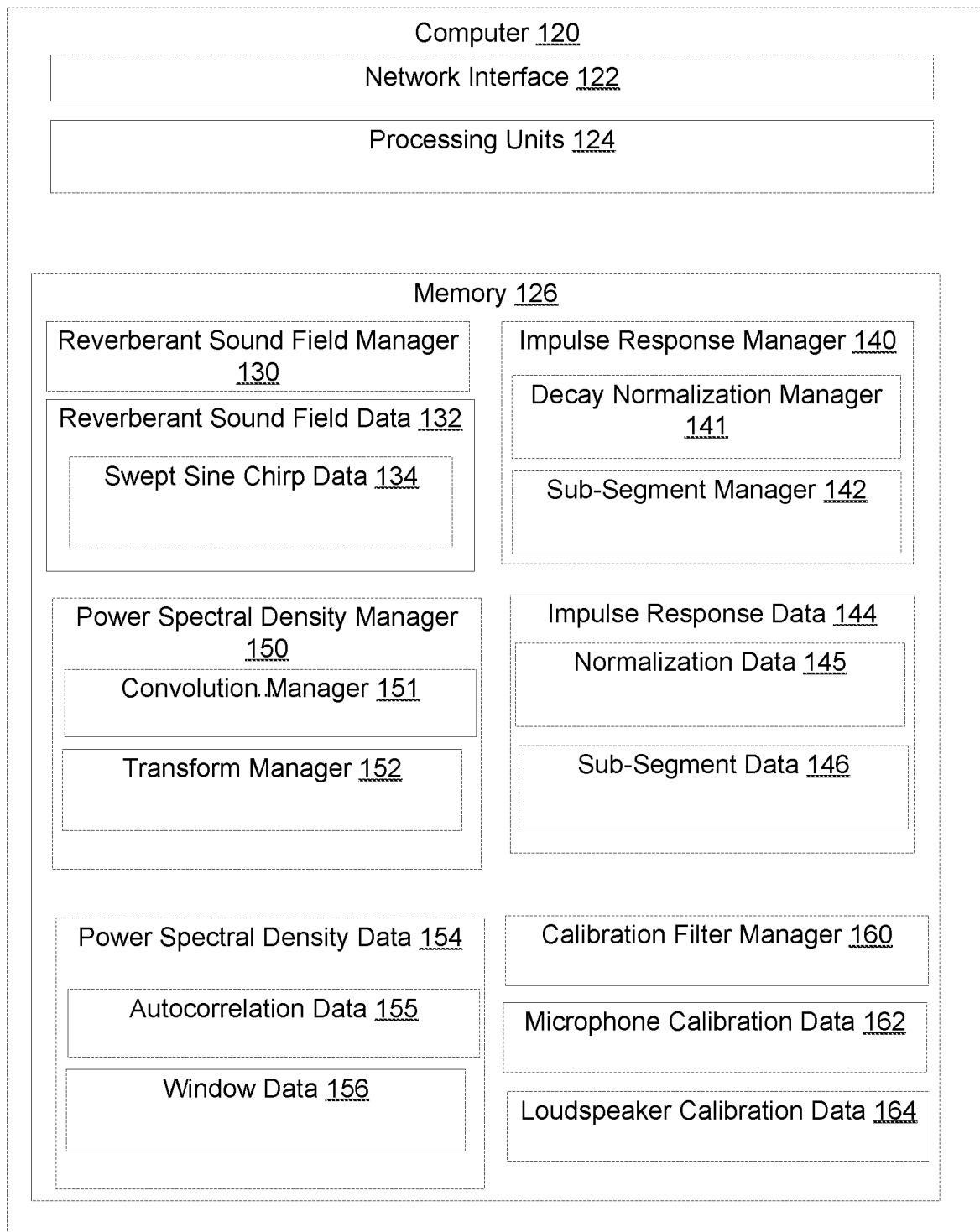
FIG. 1A is a diagram that illustrates an example electronic environment for implementing the technical solution described herein.

To accurately capture signals from the microphones that can be used to generate high-quality directionally-sensitive audio signals, each microphone of the array may be calibrated (e.g., the gain of the microphone) relative to the other microphones. Moreover, to accurately render realistically-spatialized output in a telepresence system, each loudspeaker must also be calibrated (e.g., the gain of the loudspeaker) relative to the other loudspeakers. Conventional approaches to performing such calibrations involve using external hardware, e.g., a sound source and a microphone located at the anticipated position of a user/speaker in the telepresence conferencing system.

For such telepresence systems, however, a technical problem with the above-described conventional approaches to calibrating microphones and loudspeakers is that the equipment is cumbersome to use and store, requires human involvement for the setup and tear down, and is prone to errors if the hardware is not positioned accurately with respect to the location of an actual user of the system. Moreover, the equipment may also be prone to errors if the hardware is not configured accurately, e.g., volume knobs or equalizer adjustments.

In contrast to the conventional approaches to solving the above-described technical problem, a technical solution to the above-described technical problem includes generating calibration filters for microphones and/or speakers by deriving power spectral densities at each microphone in response to signals generated by each loudspeaker. For example, a computer within an improved telepresence system can measure a raw impulse response function corresponding to each channel, i.e., each loudspeaker/microphone pair. In some implementations, the computer normalizes the raw impulse response function based on contributions of different reverberant reflections to a reverberant sound field energy. The computer then extracts a sub-segment of each impulse response function between a start time and a finish time after a time at which the signal was generated by the loudspeaker. The computer then generates a white-noise power spectral density for each channel based on the sub-segments. The calibration function for a microphone is then based on a reciprocal of the power spectral density averaged over the loudspeakers. The calibration function for a loudspeaker is then based on a reciprocal of the power spectral density averaged over the microphones.

A technical advantage of the above-described technical solution is that the technical solution is insensitive to room configuration and may be performed automatically without human involvement. The technical solution is also insensitive to hardware configuration, e.g., positions of microphones and loudspeakers with respect to each other. Further, the technical solution does not require any external hardware beyond the hardware that already exists in the telepresence system. In essence, a user may cause the calibration filters to be generated by simply flipping a switch.

In some implementations, the computer normalizes the raw impulse response functions for all channels with an impulse-response energy averaged across loudspeakers and microphones. In some implementations, the start time is based on a distance traveled by an echo in a reverberant sound field. In some implementations, the finish time is based on a noise-floor associated with the measurement process. In some implementations, the white-noise power spectral density for a channel is based on a Fourier transform of a white-noise autocorrelation of the sub-segment for that channel. In some implementations, the Fourier transform is taken over a windowed version of the white-noise autocorrelation function.

FIG. 1A is a diagram that illustrates an example electronic environment 100 in which the above-described improved techniques may be implemented. As shown in FIG. 1A, the example electronic environment 100 includes a computer 120.

The computer 120 includes a network interface 122, one or more processing units 124, and memory 126. The network interface 122 includes, for example, Ethernet adaptors, and the like, for converting electronic and/or optical signals received from a network to electronic form for use by the computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computer 120 can include processors (e.g., processing units 124) configured to process instructions stored in the memory 126. Examples of such instructions as depicted in FIG. 1 include a reverberant sound field manager 130, an impulse response manager 140, a power spectral density manager 150, and a calibration filter manager 160. Further, as illustrated in FIG. 1, the memory 126 is configured to store various data, which is described with respect to the respective managers that use such data.

The reverberant sound field manager 130 is configured to generate reverberant sound field data 132, which represents a reverberant sound field produced by loudspeakers and used to measure impulse responses at the microphones. The sound field is reverberant because, once converted to an audio signal at a loudspeaker, the audio signal may be reflected off nearby walls, ceilings, floors, and objects in a room in which the computer 120, loudspeakers, and microphones are contained.

In some implementations, the reverberant sound field data 132 is produced via a signal of a particular mathematical form emanating from a loudspeaker that lends itself to measuring a frequency response of a microphone with a high signal to noise ratio (SNR). The reverberant sound field data 132 is then derived from reflections from, e.g., walls, ceiling, floor, and objects in a room that includes the computer 120, microphones, and loudspeakers. (See FIG. 1B.) In some implementations, the mathematical form includes a swept sine chirp signal represented by swept sine chirp data 134. For example, in some implementations, a swept sine chirp signal x(t) may take the following form:

$$x(t) = \sinsin\left\{\frac{2\pi f_1 T}{\log\log\left(\frac{f_1}{f_2}\right)}\left[\left(\frac{f_1}{f_2}\right)^{\frac{t}{T}} - 1\right]\right\} \quad \#(1)$$

where $f_1$ is a starting (first) frequency, $f_2$ is a finishing (second) frequency, and T is a chirp duration. This swept sine chirp signal has an advantage of mitigating effects of loudspeaker nonlinearity from the measurement of the frequency response at a microphone.

The impulse response manager 140 is configured to generate impulse response data 144 representing impulse response functions, h(m, s, t), for loudspeaker-microphone channels, where m represents a microphone index identifying a microphone of a microphone array, s represents a loudspeaker index identifying a loudspeaker of a loudspeaker array, and t represents the time. Accordingly, each pair (m, s) represents a channel over which the impulse response manager 140 measures a raw impulse response function, h(m, s, t), from the reverberant sound field data 132. In some implementations, the impulse response manager 140 includes a decay normalization manager 141 and/or a sub-segment manager 142.

The decay normalization manager 141 is configured to provide a consistent normalization factor over the multiple channels, the normalization factor being represented by normalization data 145. The normalization factor is used to normalize the contributions of different reverberant reflections to the computations for the calibration filters for the microphones and loudspeakers. This normalization factor makes it possible for the calibration results to be insensitive to hardware configuration. In some implementations, the decay normalization manager 141 is configured to estimate an impulse response energy e(m, s, t) as a function of time for each channel. In some implementations, the decay normalization manager 141 performs such an estimation by temporally smoothing the square of the impulse response functions, h(m, s, t)². In some implementations, the decay normalization manager 141 performs the temporal smoothing by performing a moving average of the impulse response data over a specified time duration, e.g., 1.5 ms, although the duration may be smaller or larger than 1.5 ms. In some implementations, the decay normalization manager 141 compensates for delay induced by the temporal smoothing to time-align the energy estimate with the corresponding impulse response. In some implementations, the decay normalization manager 141 computes the normalization factor as a square root of the impulse response energy averaged over the microphones and loudspeakers, i.e., $$h_{decay-normalized}(m, s, t) = \frac{h(m, s, t)}{\sqrt{e_{avg(t)}}}, \quad \#(2)$$

$$e_{avg(t)} = \frac{1}{ML}\sum_{m=1}^{M}\sum_{s=1}^{L} e(m, s, t). \quad \#(3)$$

The sub-segment manager 142 is configured to extract a time-based sub-segment of the impulse response functions h(m, s, t) between a first time and a second time to produce sub-segment data 146 representing an impulse response sub-segment $h_{analysis}$(m, s, t). In some implementations, the first time is based on a distance traveled by an echo (i.e., a reverberant sound field reflected off a wall, ceiling, floor, or object). Defining the first time in such a manner may mitigate distance-related energy effects. For example, for a sound velocity of 343 m/s, a delay of 45 ms relative to an onset of an impulse response corresponds to a distance of about 15.4 m traveled by an echo.

The power spectral density manager 150 is configured to produce power spectral density data 154 based on the impulse response data 144. The power spectral density data 154 represents a white-noise power spectral density $S_{analysis}$(m, s, f), where f is a frequency. In some implementations, the power spectral density manager 150 includes a convolution manager 151 and a transform manager 152.

The convolution manager 151 is configured to perform a convolution on time-based functions to produce autocorrelation data 155 representing another time-based function. Specifically, the convolution manager 151 is configured to generate autocorrelation functions from the impulse response functions for each microphone and loudspeaker. In some implementations, the autocorrelation function $r_{analysis}$(m, s, t) represented by the autocorrelation data 155 is given by $$r_{analysis}(m,s,t)=\int_{-\infty}^{\infty}h_{analysis}(m,s,\tau)h_{analysis}(m,s,t+\tau)d\tau. \quad \#(4)$$

The transform manager 152 is configured to perform a transform to frequency space of a time-based function. Specifically, the time-based function on which the transform manager 152 performs a transform to frequency space is the autocorrelation function $r_{analysis}$(m, s, t) to produce the power spectral density data 154 representing a power spectral density $S_{analysis}$(m, s, f). In some implementations, the transform manager 152 is configured to multiply the autocorrelation function $r_{analysis}$(m, s, t) by a window function W(t), represented by window data 156. In some implementations, the window function W(t) has a duration of 1 ms, although the duration can be greater than or less than 1 ms.

In some implementations, the transform manager applies a Fourier transform to the product of $r_{analysis}$(m, s, t) and W(t). In some implementations, because representations of the time-based functions may be discrete in time, the Fourier transform is performed using a Fast Fourier Transform implementation. In some implementations, the transform manager uses a wavelet transform to produce the transform to frequency space.

The calibration filter manager 160 is configured to produce microphone calibration data 162 and/or loudspeaker calibration data 164. Specifically, the calibration filter manager 160 performs averaging operations on the power spectral density data 154 over (i) loudspeaker to produce a loudspeaker-averaged power spectral density $S_{microphone}(m, f)$, (ii) microphone to produce a microphone-averaged power spectral density $S_{loudspeaker}(s, f)$, and (iii) a microphone- and loudspeaker averaged power spectral density $S_{avg}(f)$. Specifically, $$S_{microphone}(m, f) = \frac{1}{L}\sum_{s=1}^{L} S_{analysis}(m, s, f), \quad \#(5)$$

$$S_{loudspeaker}(s, f) = \frac{1}{M}\sum_{m=1}^{M} S_{analysis}(m, s, f), \quad \#(6)$$

$$S_{avg}(f) = \frac{1}{LM}\sum_{s=1}^{L}\sum_{m=1}^{M} S_{analysis}(m, s, f). \quad \#(7)$$

The calibration filter manager 160 then computes, as the microphone calibration filter represented by the microphone calibration data 152, as $$C_{microphone}(m, f) = \frac{S_{avg}(f)}{S_{microphone}(m, f)}, \quad \#(8)$$

$$C_{loudspeaker}(s, f) = \frac{S_{avg}(f)}{S_{loudspeaker}(s, f)}. \quad \#(9)$$

With these calibration filters, the microphones are calibrated to record the same spectrum in response to the same input stimulus, and the loudspeakers are calibrated to produce the same spectrum in response to the same input stimulus.

Figure 1B:
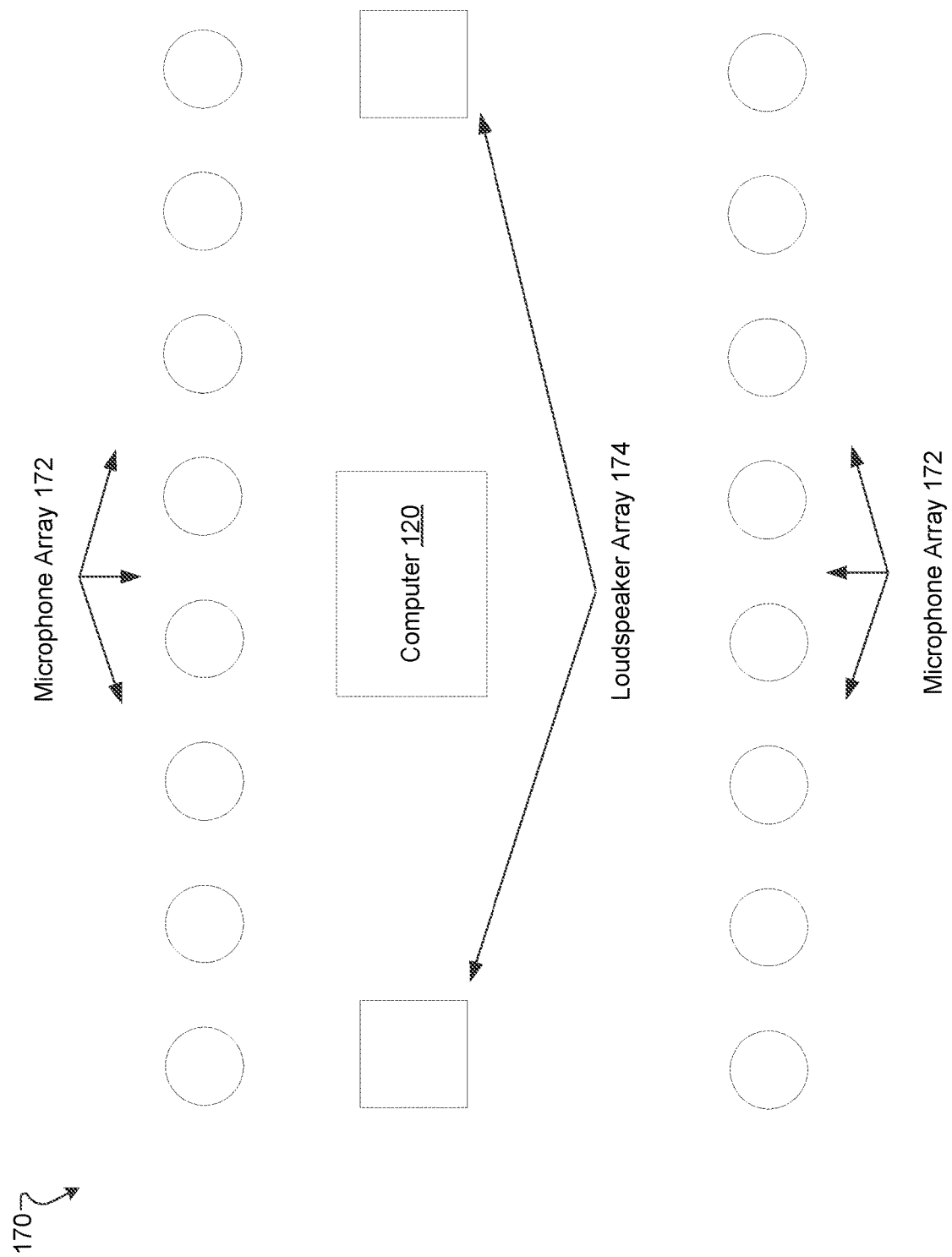
FIG. 1B is a diagram that illustrates an example configuration of microphones and loudspeakers within the electronic environment illustrated in FIG. 1A.

FIG. 1B is a diagram that illustrates an example configuration 170 of microphones 172 and loudspeakers 174 and the computer 120 that can perform the calibration of the microphones 172 and loudspeakers 174. In the configuration 170 shown in FIG. 1B, there are sixteen microphones and two loudspeakers. Examples of microphones 172 that may be used in the configuration 170 include Invensense ICS-52000 TDM microphones. Examples of loudspeakers 174 that may be used in the configuration 170 include Tymphany TC5FC07-04. It is noted that any number of microphones and loudspeakers may be considered.

Figure 1C:
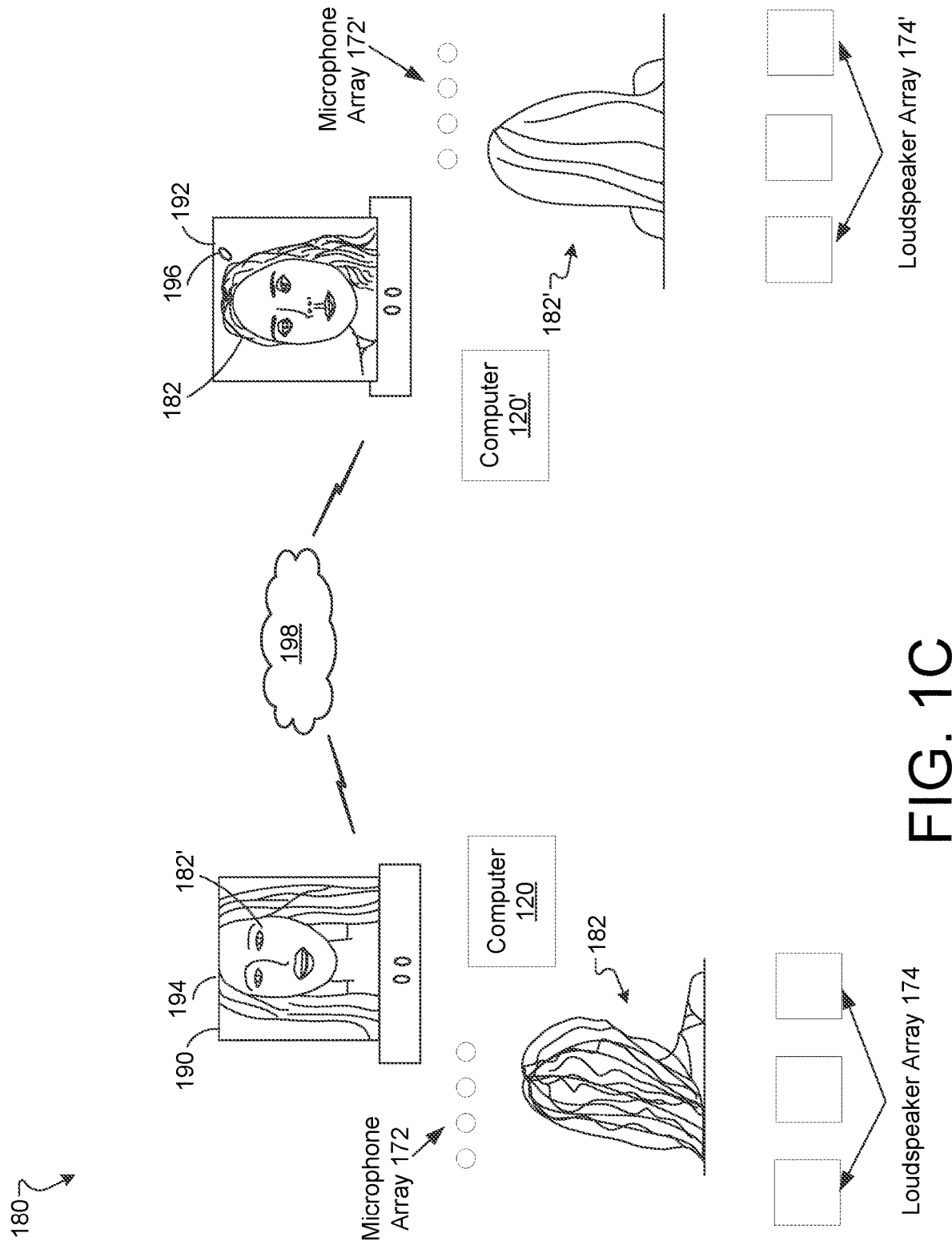
FIG. 1C is a diagram that illustrates an example configuration of microphones and loudspeakers within a telepresence system.

FIG. 1C is a diagram that illustrates an example configuration of microphones and loudspeakers within a telepresence system 180. The telepresence system 180 can be used by multiple users to, for example, conduct video conference communications in 3D (e.g., telepresence sessions). In general, the system 180 shown in FIG. 1C may be used to capture video and/or images of users during a 2D or 3D video conference.

As shown in FIG. 1C, the telepresence system 180 is being used by a first user 182 and a second user 182'. For example, the users 182 and 182' are using the telepresence system 180 to engage in a 3D telepresence session. In such an example, the telepresence system 180 can allow each of the users 182 and 182' to see a highly realistic and visually congruent representation of the other, thereby facilitating the users to interact in a manner similar to being in the physical presence of each other.

The telepresence system 180 can include one or more 2D or 3D displays. Here, a 3D display 190 is provided for the user 182, and a 3D display 192 is provided for the user 182'. The 3D displays 190, 192 can use any of multiple types of 3D display technology to provide an autostereoscopic view for the respective viewer (here, the user 102 or user 104, for example). In some implementations, the 3D displays 190, 192 may be a standalone unit (e.g., self-supported or suspended on a wall). In some implementations, displays 190, 192 may be 2D displays.

In general, displays, such as displays 190, 192 can provide imagery that approximates the 3D optical characteristics of physical objects in the real world without the use of a head-mounted display (HMD) device. In general, the displays described herein include flat panel displays, lenticular lenses (e.g., microlens arrays), and/or parallax barriers to redirect images to a number of different viewing regions associated with the display.

In some example displays, there may be a single location that provides a 3D view of image content (e.g., users, objects, etc.) provided by such displays. A user may be seated in the single location to experience proper parallax, minimal distortion, and realistic 3D images. If the user moves to a different physical location (or changes a head position or eye gaze position), the image content (e.g., the user, objects worn by the user, and/or other objects) may begin to appear less realistic, 2D, and/or distorted. The systems and techniques described herein may reconfigure the image content projected from the display to ensure that the user can move around, but still experience proper parallax, low rates of distortion, and realistic 3D images in real time. Thus, the systems and techniques described herein provide the advantage of maintaining and providing 3D image content and objects for display to a user regardless of any user movement that occurs while the user is viewing the 3D display.

As shown in FIG. 1, the telepresence system 180 can include one or more networks. The network 198 can be a publicly available network (e.g., the Internet), or a private network, to name just two examples. The network 198 can be wired, or wireless, or a combination of the two. The network 198 can include, or make use of, one or more other devices or systems, including, but not limited to, one or more servers (not shown).

The telepresence system 180 further includes the microphone array 172 and loudspeaker array 174 for the user 182, as well as an analogous microphone array 172' and loudspeaker array 174' for the user 182'. These are arranged in order to provide the most realistic audio experience for the users 182 and 182'. The loudspeaker arrays 174 and 174' can provide 3D audio signals to the local and the microphone arrays 172 and 172' can be used to detect 3D audio signals from the user that then can be encoded and sent to the remote user for rendering of a 3D sound field to the remote user representing the sounds in the telepresence system 180.

Figure 2:
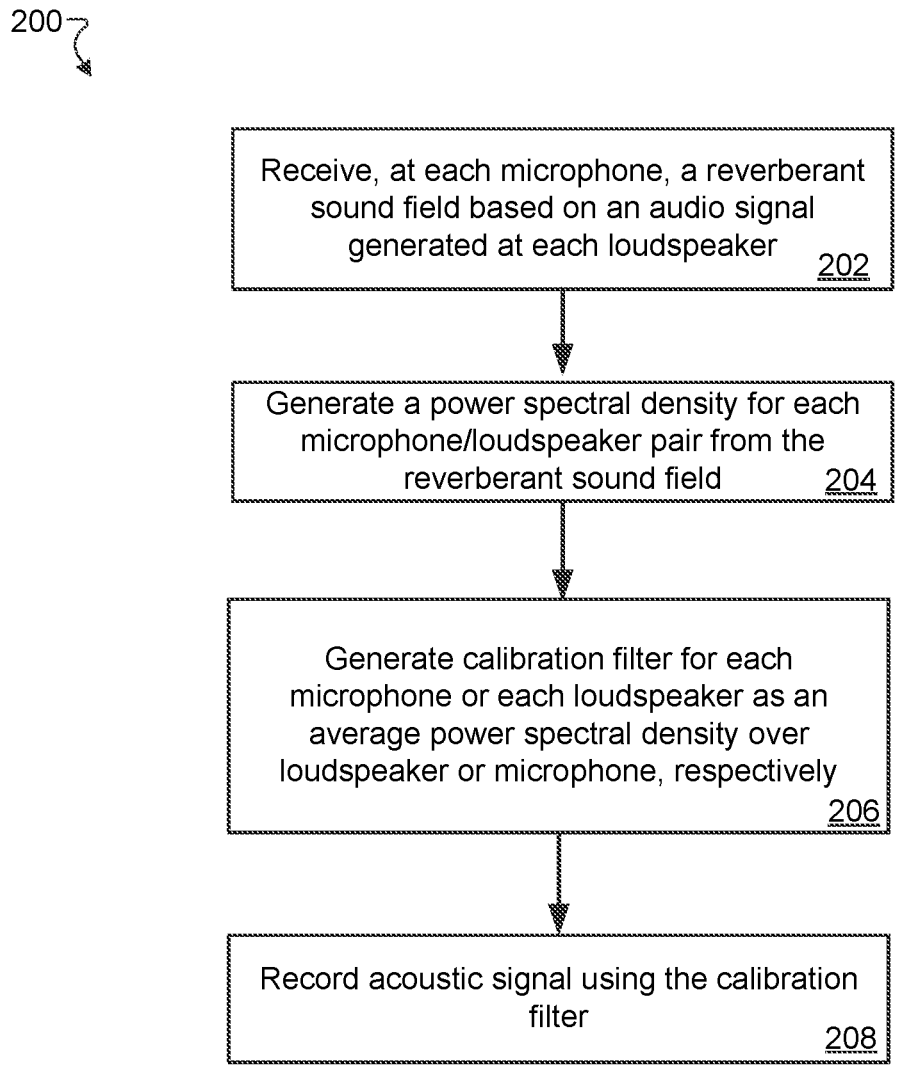
FIG. 2 is a flow chart that illustrates an example method of performing the technical solution within the electronic environment shown in FIG. 1A.

FIG. 2 is a flow chart depicting an example method 200 of calibrating microphones and loudspeakers. The method 200 may be performed by software constructs described in connection with FIG. 1, which reside in memory 126 of the user device computer 120 and are run by the set of processing units 124 or may be performed by software constructs which reside in memory of a computing device different from (e.g., remote from) user device computer 120.

At 202, the impulse response manager 140 receives, via each microphone of an array of microphones, a reverberant sound field (e.g., reverberant sound field data 132) based on a signal (e.g., swept sine chirp signal data 134) generated by the reverberant sound field manager 130 at each loudspeaker of an array of loudspeakers. For example, the reverberant sound field manager 130 causes the swept sine chirp to be emitted from the array of loudspeakers. In some implementations, the swept sine chirp is emitted from each loudspeaker of the array of loudspeakers, one by one, separated in time. In some implementations, the swept sine chirp is emitted from a plurality of speakers of the array of loudspeakers all at the same time. After the swept sine chirp is emitted from one or more of the loudspeakers, each microphone of the array of microphones records the subsequent reverberant sound field over the duration at least as long the duration of the swept sine chirp, T, according to Eq. (1). In some implementations, the microphones record the subsequent reverberant sound field between a start time and an end time. In some implementations, the difference between the start and end time differs from T. In some implementations, the start time and/or end time are based on measured characteristics of the reverberant sound field. For example, the start time may be based on a time at which direct sound to the microphone—that is, sound that undergoes no reflections and follows a direct path to the microphone—may be ignored. In such an example, the reverberant sound field manager 130 may boost the amplitude of the reverberant sound field because the audio signal as reflected from boundaries and/or obstacles may suffer some degradation. Note that by using the reverberant, rather than direct, sound field, the calibrated microphones may generate high-quality directionally-sensitive audio signals.

At 204, the power spectral density manager 150 generates, for each microphone of the array of microphones and for each loudspeaker of the array of loudspeakers, a respective power-spectral density (e.g., power spectral density data 154) for that microphone and that loudspeaker based on the respective reverberant sound field generated by that loudspeaker and received at that microphone. The generation of the power spectral density is described in detail with regard to FIG. 3.

At 206, the calibration filter manager 160 generates, for each microphone of the array of microphones, a respective calibration filter (e.g., microphone calibration data 162) based on a ratio of the power spectral density averaged over the array of loudspeakers and the array of microphones (Eq. (7)) and a power spectral density averaged over the array of loudspeakers (Eq. (5)).

With these calibration filters, the microphones are calibrated to record the same spectrum in response to the same input stimulus, and the loudspeakers are calibrated to produce the same spectrum in response to the same input stimulus. Moreover, because the calibration filters are based on a reverberant sound field, rather than direct sound fields, the calibration factors are largely insensitive to the geometry of the environment in which the loudspeakers and the microphones are place and any nodes in the direct sound signals, and the calibration filters cause the microphones to generate high-quality directionally-sensitive audio signals.

At 208, the computer 120 records an acoustic signal from a user by the array of microphones using the respective calibration filters that were generated for each microphone of the array of microphones, with each microphone of the array of microphones recording essentially the same spectrum of the acoustic signal. The signals recorded from the calibrated microphones then can be processed to generate spatial audio signals representing the sound in the environment of the array of microphones (e.g., speech uttered by one or more speakers using a telepresence system that includes the array of microphones), and the generated spatial audio signals can be transmitted to a sound rendering system (e.g., a remote telepresence system) for rendering.

Figure 3:
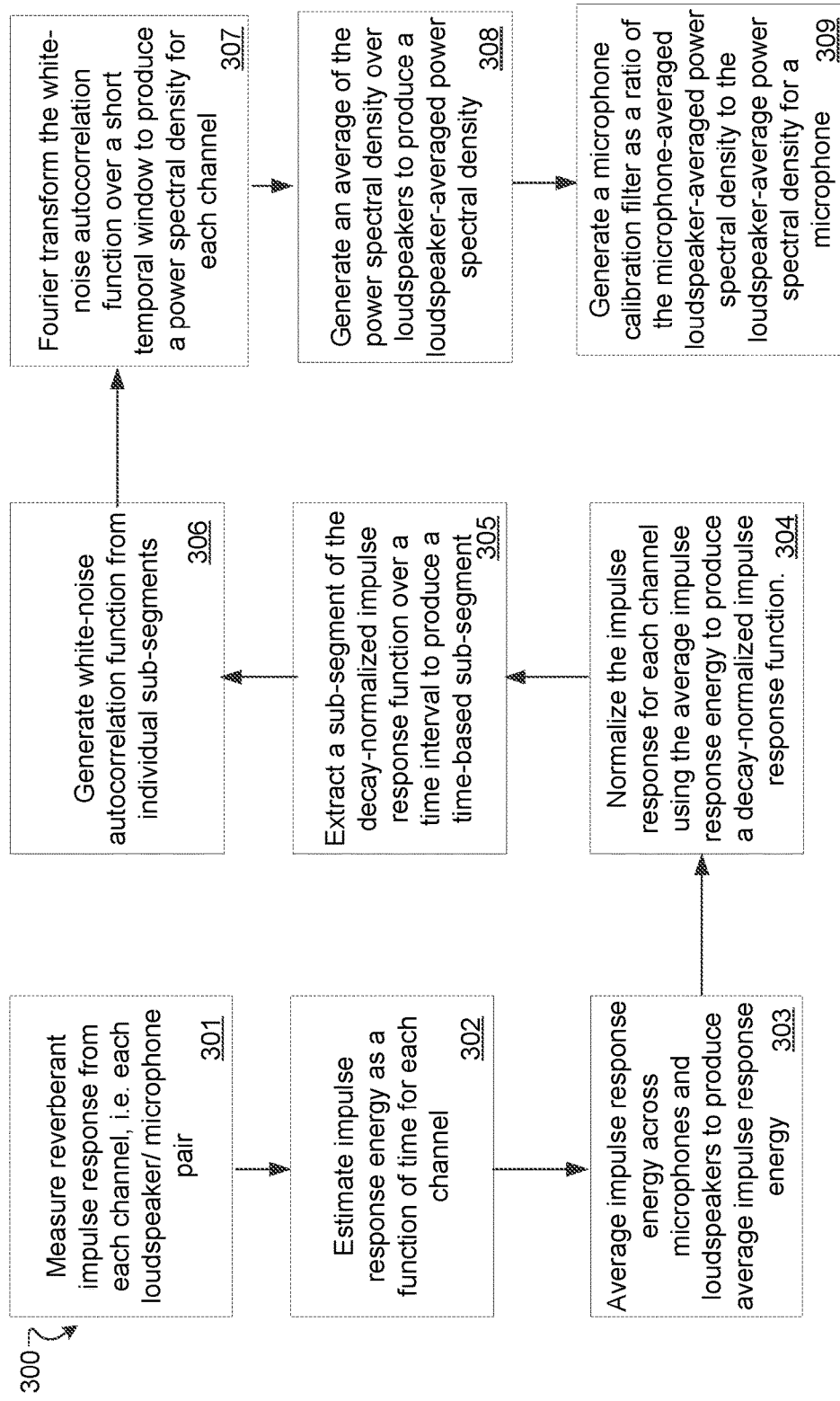
FIG. 3 is a flow chart that illustrates an example process for calibrating microphones of a microphone array according to the technical solution.

FIG. 3 is a flow chart that illustrates an example process 300 for calibrating microphones of a microphone array. The process 300 may be performed by software constructs described in connection with FIG. 1, which reside in memory 126 of the user device computer 120 and are run by the set of processing units 124 or may be performed by software constructs which reside in memory of a computing device different from (e.g., remote from) user device computer 120.

At 301, the impulse response manager 140 measures a reverberant (raw) impulse response from each channel, i.e., each microphone/loudspeaker pair. As mentioned above, the impulse response may be derived from reflections from walls, ceiling, floor, or objects received at a microphone originating from a swept sine chirp generated by the reverberant sound field manager 130. The actual recording of the signal occurs at a start time that occurs after a sufficient amount of time has passed after a direct audio signal has been received at a microphone. Accordingly, the reverberant sound field measured at a microphone includes only signals reflected from boundaries and obstacles.

Example raw impulse response functions for two loudspeakers and four microphones are illustrated in FIG. 4A, making eight raw impulse response functions. In some implementations, each of the raw impulse response functions are measured based on a reverberant sound field from a single loudspeaker. In some implementations, each loudspeaker generates the swept sine chirp at different times. In some implementations, the raw impulse response functions are measured at the array of microphones all at once. In some implementations, the raw impulse response functions are measured at the array of microphones one at a time.

At 302, the decay normalization manager 141 estimates the impulse response energy as a function of time for each channel. FIG. 4B illustrates an example time-dependent energy metric associated with the raw impulse response function from FIG. 4A; note that the ordinate of the plot in FIG. 4B is the square root of the energy.

Figure 4C:
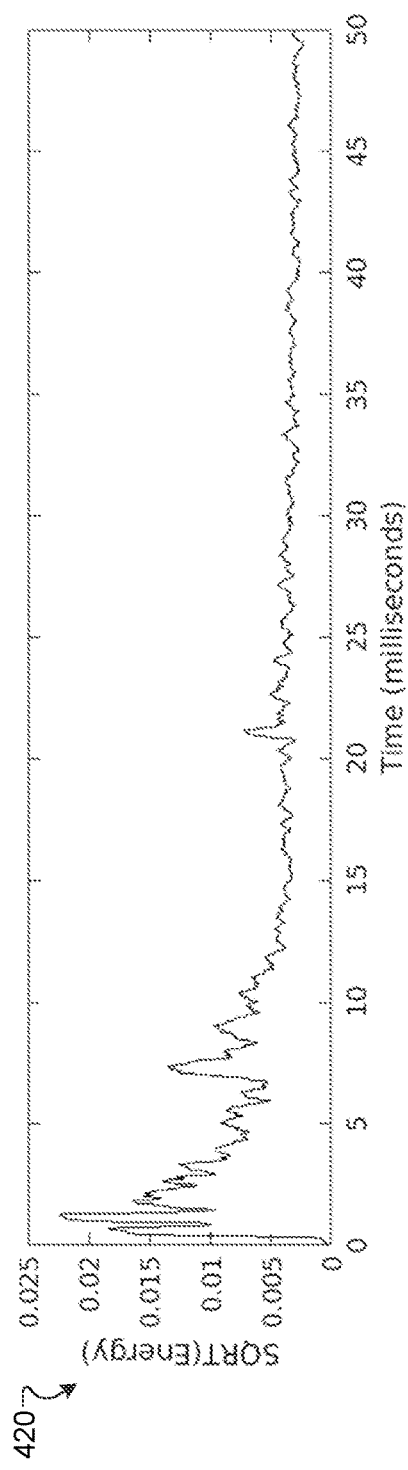
FIG. 4C is a plot that illustrates an example time-dependent energy metric from FIG. 4B, averaged across all loudspeakers and microphones.

At 303, the decay normalization manager 141 averages the impulse response energy across microphones and loudspeakers to produce an average impulse response energy according to Eq. (3). FIG. 4C illustrates an example time-dependent energy metric from FIG. 4B, averaged across all loudspeakers and microphones.

Figure 4D:
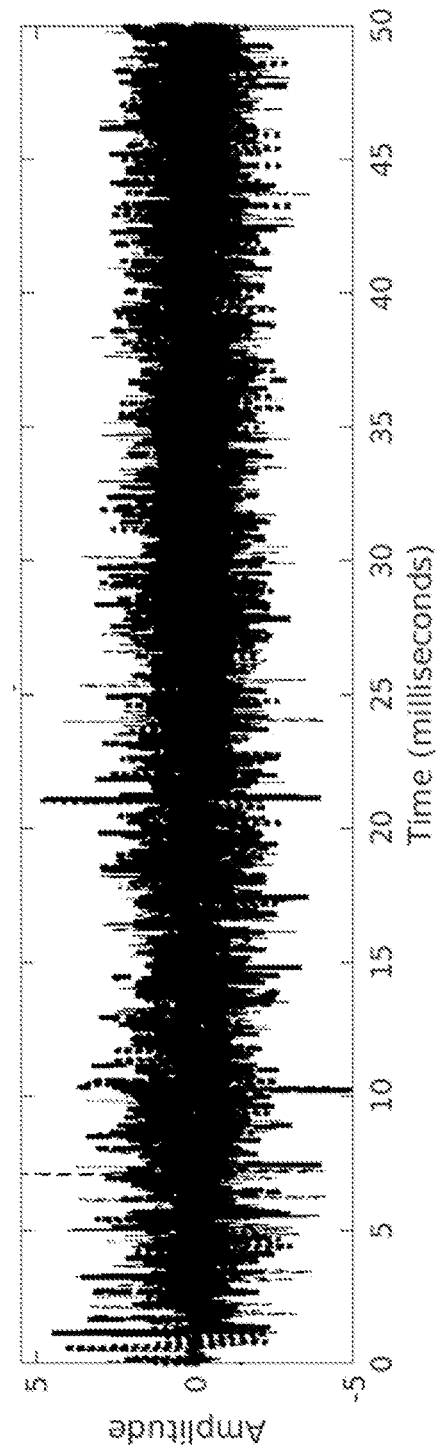
FIG. 4D is a plot that illustrates an example decay-normalized impulse response functions corresponding to the raw impulse response functions for the four microphones and two loudspeakers.

At 304, the decay normalization manager 141 normalizes the raw impulse response for each channel using the average impulse response energy to produce a decay-normalized impulse response function. FIG. 4D illustrates an example of a decay-normalized impulse response function corresponding to the raw impulse response functions for the four microphones and two loudspeakers.

Figure 4E:
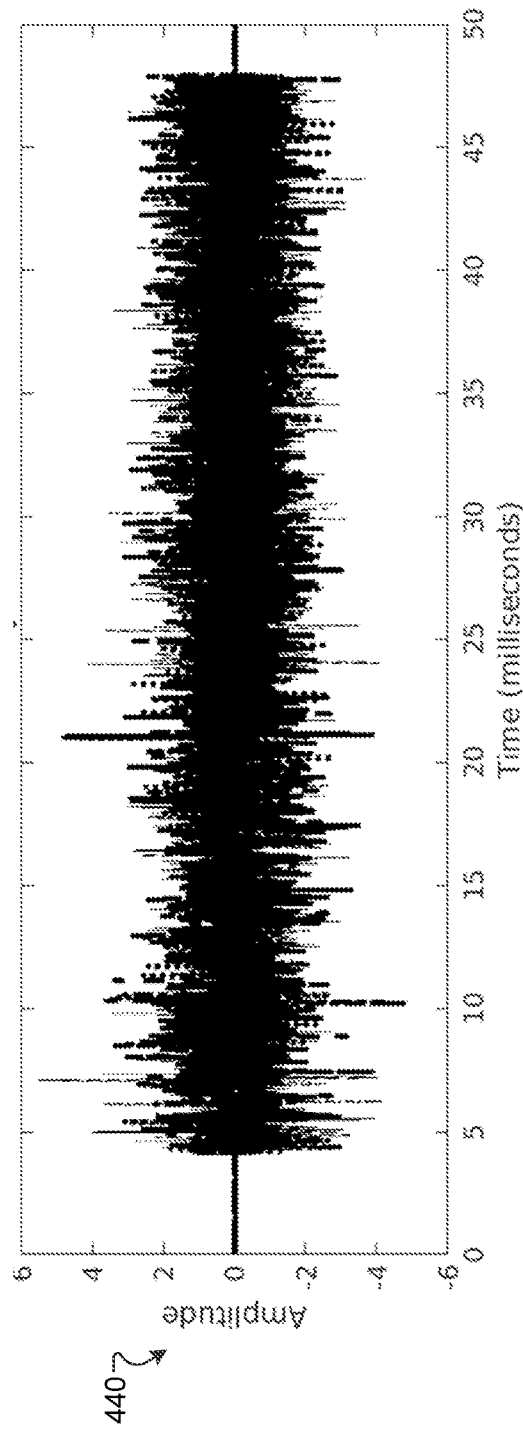
FIG. 4E is a plot that illustrates example sub-segments of the decay-normalized impulse response functions shown in FIG. 4D.

At 305, the sub-segment manager 142 extracts a sub-segment of the decay-normalized impulse response function over a time interval (i.e., from the first time to the second time) to produce a time-based sub-segment. FIG. 4E illustrates example sub-segments of the decay-normalized impulse response functions shown in FIG. 4D.

Figure 4F:
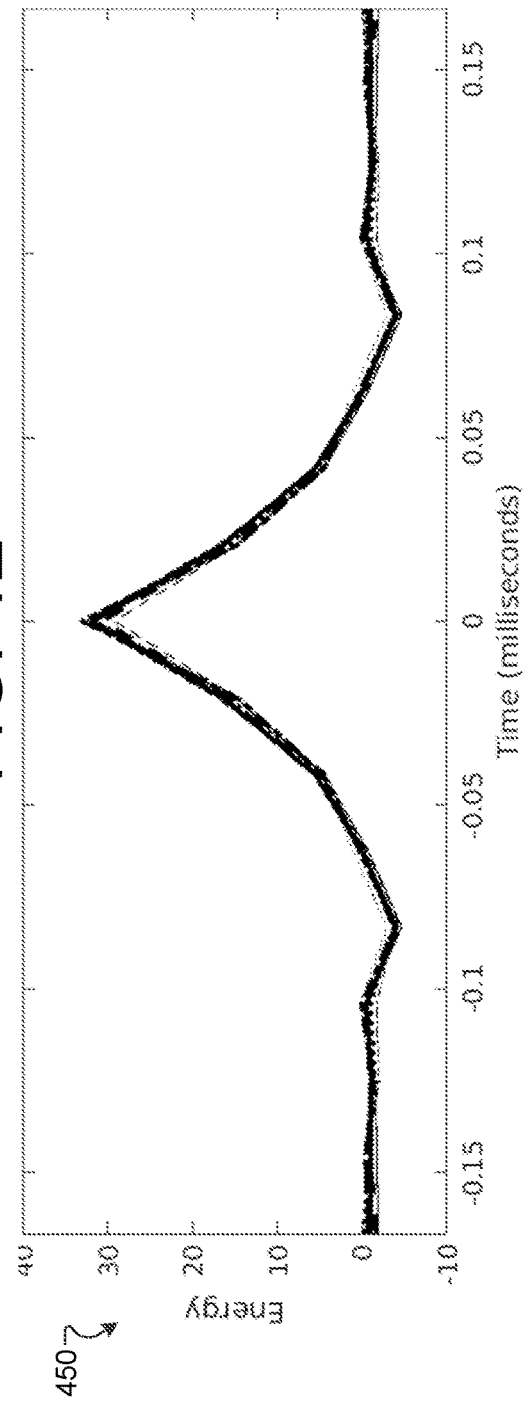
FIG. 4F is a plot that illustrates example multi-channel white noise autocorrelation functions derived from the sub-segments of the decay-normalized impulse response functions shown in FIG. 4E.

At 306, the convolution manager 151 generates a white-noise autocorrelation function from individual sub-segments. FIG. 4F illustrates example multi-channel white noise autocorrelation functions derived from the sub-segments of the decay-normalized impulse response functions shown in FIG. 4E.

Figure 4G:
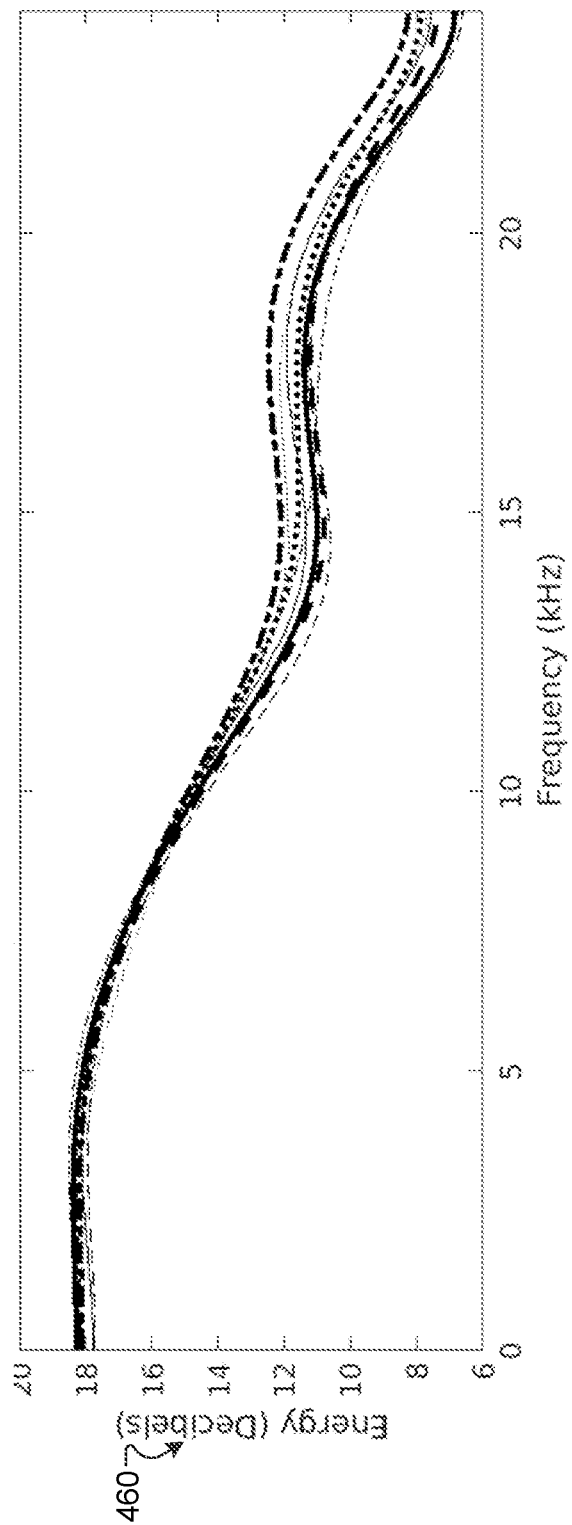
FIG. 4G is a plot that illustrates example power spectral densities corresponding to the multi-channel white noise autocorrelation functions shown in FIG. 4F.

At 307, the transform manager 152 performs a Fourier transform on the white-noise autocorrelation function over a short temporal window to produce a power spectral density for each channel according to Eq. (4). FIG. 4G illustrates example power spectral densities corresponding to the multi-channel white noise autocorrelation functions shown in FIG. 4F.

At 308, the calibration filter manager 160 generates an average of the power spectral density over the loudspeakers to produce a loudspeaker-averaged power spectral density. FIG. 4H illustrates example power spectral densities from FIG. 4G, averaged over loudspeakers.

At 309, the calibration filter manager 160 generates a microphone calibration filter as a ratio of a microphone-and-loudspeaker averaged power spectral density to the loudspeaker-averaged power spectral density. FIG. 4I illustrates example microphone calibration filters derived from the loudspeaker-averaged power spectral densities in FIG. 4H.

Figure 4J:
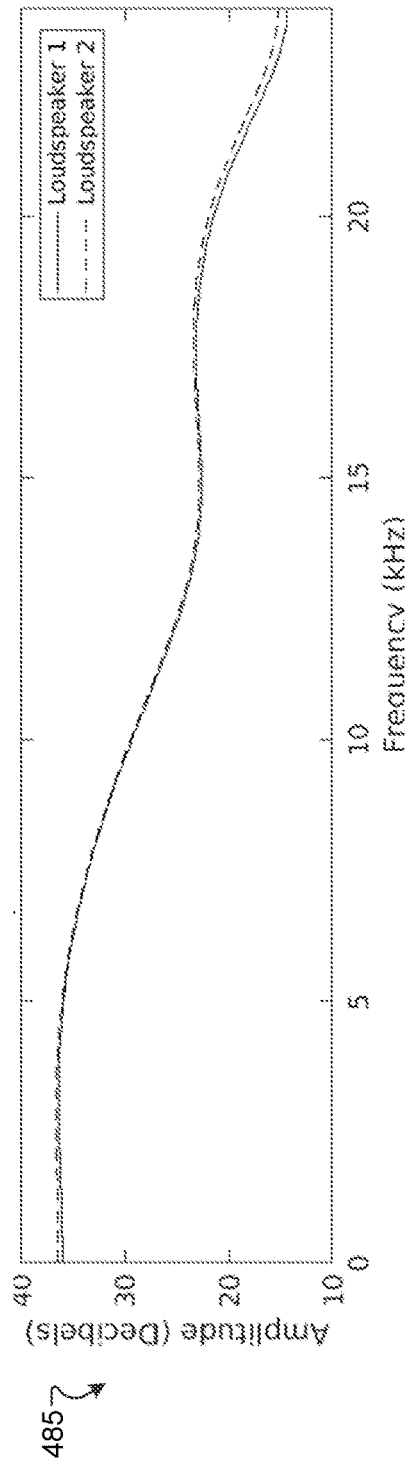
FIG. 4J is a plot that illustrates example power spectral densities from FIG. 4G, averaged over microphones.
Figure 4K:
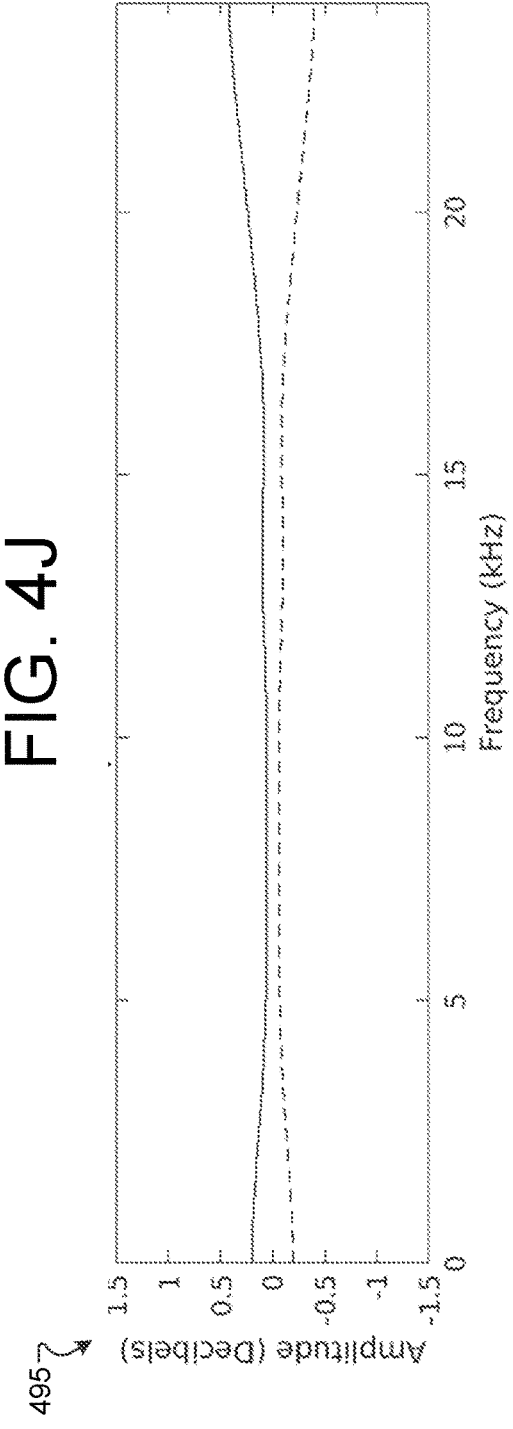
FIG. 4K is a plot that illustrates example loudspeaker calibration filters derived from the microphone-averaged power spectral densities in FIG. 4J.

Note that 308 and 309 can also be applied to generating a loudspeaker calibration filter. FIG. 4J illustrates example power spectral densities from FIG. 4G, averaged over microphones. FIG. 4K illustrates example loudspeaker calibration filters derived from the microphone-averaged power spectral densities in FIG. 4J.

Figure 5:
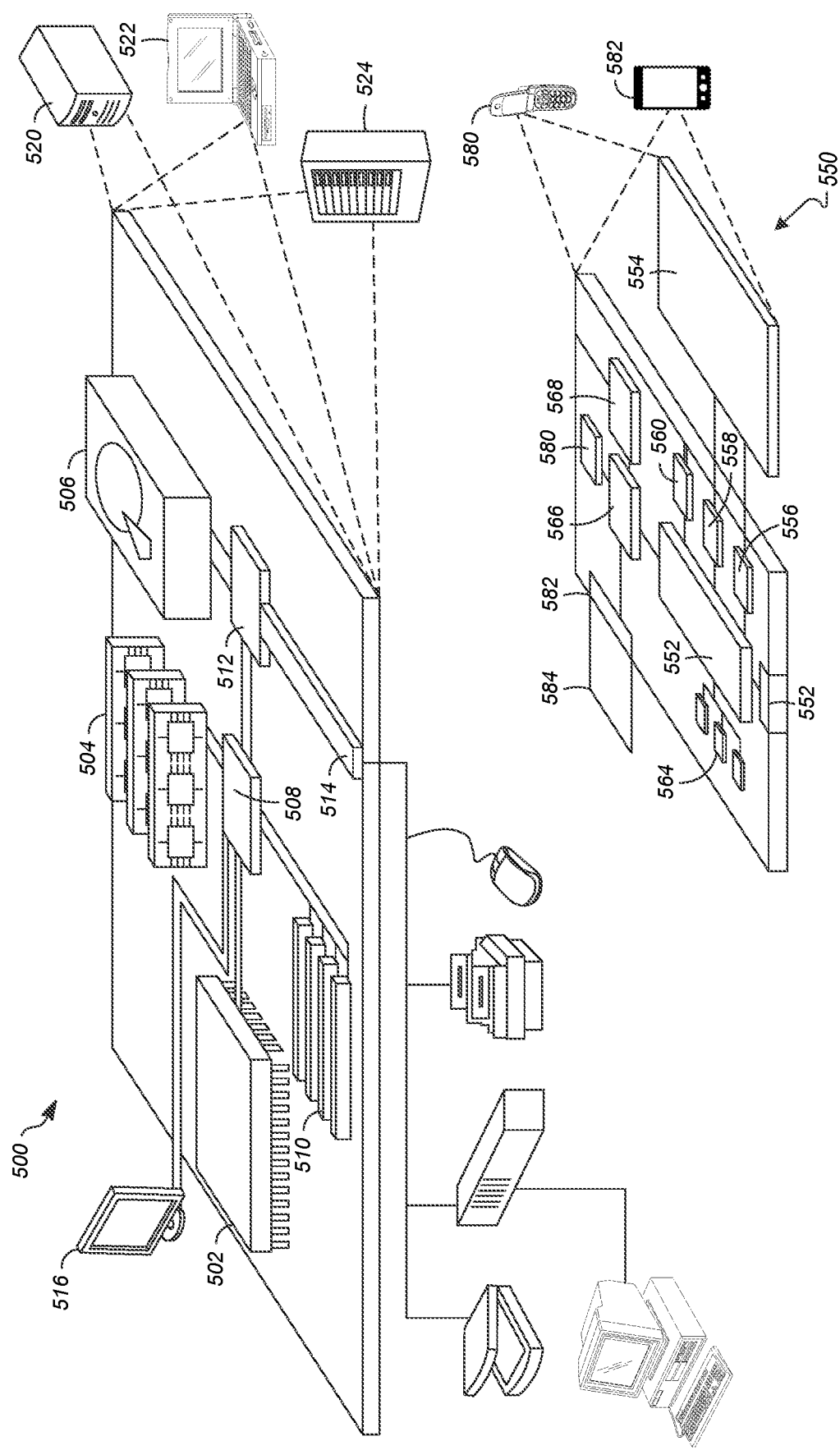
FIG. 5 illustrates an example of a computer device and a mobile computer device that can be used with circuits described here.

FIG. 5 illustrates an example of a generic computer device 500 and a generic mobile computer device 550, which may be used with the techniques described here.

As shown in FIG. 5, computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 450, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Returning to FIG. 1, in some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the compression computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the compression computer 120.

The components (e.g., modules, processing units 124) of the compression computer 120 can be configured to operate based on one or more platforms (e.g., one or more similar or different platforms) that can include one or more types of hardware, software, firmware, operating systems, runtime libraries, and/or so forth. In some implementations, the components of the compression computer 120 can be configured to operate within a cluster of devices (e.g., a server farm). In such an implementation, the functionality and processing of the components of the compression computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

Although not shown, in some implementations, the components of the computer 120 (or portions thereof) can be configured to operate within, for example, a data center (e.g., a cloud computing environment), a computer system, one or more server/host devices, and/or so forth. In some implementations, the components of the computer 120 (or portions thereof) can be configured to operate within a network. Thus, the components of the computer 120 (or portions thereof) can be configured to function within various types of network environments that can include one or more devices and/or one or more server devices. For example, a network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the computer 120 can be, or can include, processors configured to process instructions stored in a memory. For example, the depth image manager 130 (and/or a portion thereof), the viewpoint manager 140 (and/or a portion thereof), the ray casting manager 150 (and/or a portion thereof), the SDV manager 160 (and/or a portion thereof), the aggregation manager 170 (and/or a portion thereof), the root-finding manager 180 (and/or a portion thereof), and the depth image generation manager 190 (and/or a portion thereof) can be a combination of a processor and a memory configured to execute instructions related to a process to implement one or more functions.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
    receiving, via each microphone of an array of microphones, a respective reverberant sound field based on an audio signal generated by each loudspeaker of an array of loudspeakers;
    generating, for each microphone of the array of microphones and each loudspeaker of the array of loudspeakers, a respective power spectral density for that microphone and that loudspeaker based on the respective reverberant sound field generated by that loudspeaker and received at that microphone; and
    generating, for each microphone of the array of microphones, a respective calibration filter based on a power spectral density averaged over the array of loudspeakers.

2. The method as in claim 1, wherein generating the respective power-spectral density for each microphone of the array of microphones and each loudspeaker of the array of loudspeakers includes:

generating a respective impulse response function for that microphone and loudspeaker based on the respective reverberant sound field generated by that loudspeaker and received at that microphone.

3. The method as in claim 2, wherein generating the respective power-spectral density for each microphone of the array of microphones and each loudspeaker of the array of loudspeakers further includes:
performing an autocorrelation of the respective impulse response function for that microphone and loudspeaker to produce an autocorrelated impulse response function; and
performing a transform to frequency space on the autocorrelated impulse response function to produce the respective power-spectral density for that microphone and loudspeaker.

4. The method as in claim 3, wherein performing the transform to frequency space on the autocorrelated impulse response function includes:
generating a window function that is equal to a constant within a specified time interval and zero outside of the specified time interval; and
performing a Fourier transform operation on a product of the window function and the autocorrelated impulse response function.

5. The method as in claim 2, further comprising, prior to generating the respective impulse response function:
generating, at that loudspeaker as the audio signal, a swept sine chirp signal having frequencies between a first frequency and a second frequency, the swept sine chirp signal being received at that microphone.

6. The method as in claim 2, wherein generating the respective impulse response function includes:
for each microphone of the array of microphones and each loudspeaker of the array of loudspeakers:
measuring a respective raw impulse response function corresponding to that microphone and that loudspeaker; and
generating a time-dependent energy metric associated with that raw impulse response function;
generating a normalization factor based on an average, over the array of microphones and the array of loudspeakers, of respective time-dependent energy metrics associated with each microphone of the array of microphones and each loudspeaker of the array of loudspeakers; and
dividing the respective raw impulse response function corresponding to each microphone of the array of microphones and each loudspeaker of the array of loudspeakers by the normalization factor to produce a decay-normalized impulse response function corresponding to that microphone and that loudspeaker.

7. The method as in claim 6, wherein generating the time-dependent energy metric associated with the respective raw impulse response function corresponding to each microphone of the array of microphones and each loudspeaker of the array of loudspeakers includes:
generating a first power of an absolute value of the respective raw impulse response function corresponding to that microphone and that loudspeaker; and
performing a smoothing operation on the first power of the absolute value of the respective raw impulse response function to produce the time-dependent energy metric associated with the respective raw impulse response function corresponding to that microphone and that loudspeaker.

8. The method as in claim 7, wherein performing the smoothing operation includes:
generating a moving average of the first power of the absolute value of the respective raw impulse response function over a specified extent of time.

9. The method as in claim 7, wherein generating the normalization factor includes:
generating a second power of the time-dependent energy metric associated with the respective raw impulse response function corresponding to each microphone of the array of microphones and each loudspeaker of the array of loudspeakers, the second power being an inverse of the first power.

10. The method as in claim 6, wherein generating the respective impulse response function includes:
obtaining, as the respective impulse response function corresponding to each microphone of the array of microphones and each loudspeaker of the array of loudspeakers, a sub-segment of the decay-normalized impulse response function corresponding to that microphone and that loudspeaker, the sub-segment beginning at a first time and ending at a second time.

11. The method as in claim 10, wherein the first time is based on a minimum distance traveled by an echo of the respective reverberant sound field.

12. The method as in claim 10, wherein the second time is based on an estimate of a length of time taken for the respective raw impulse response function to decay to a noise floor associated with a measuring of the respective raw impulse response function.

13. A method, comprising:
receiving, via each microphone of an array of microphones, a respective reverberant sound field based on an audio signal generated by each loudspeaker of an array of loudspeakers;
generating, for each microphone of the array of microphones and each loudspeaker of the array of loudspeakers, a respective power spectral density for that microphone and that loudspeaker based on the respective reverberant sound field generated by that loudspeaker and received at that microphone;
generating, for each loudspeaker of the array of loudspeakers, a respective calibration filter as a ratio of a power spectral density averaged over the array of microphones and the array of loudspeaker and a power spectral density averaged over the array of microphones; and
producing an acoustic signal by the array of loudspeakers using the respective calibration filter generated for each loudspeaker of the array of loudspeakers, each of the array of loudspeakers using the respective calibration filter producing essentially the same spectrum of the acoustic signal in response to the same output stimulus.

14. A computer program product comprising a nontransitory storage medium, the computer program product including code that, when executed by processing circuitry of a computing device, causes the processing circuitry to perform a method, the method comprising:
receiving, via each microphone of an array of microphones, a respective reverberant sound field based on an audio signal generated by each loudspeaker of an array of loudspeakers;
generating, for each microphone of the array of microphones and each loudspeaker of the array of loudspeakers, a respective power spectral density for that microphone and that loudspeaker based on the respective reverberant sound field generated by that loudspeaker and received at that microphone;

generating, for each microphone of the array of microphones, a respective calibration filter as a ratio of a power spectral density averaged over the array of loudspeakers and the array of microphones and a power spectral density averaged over the array of loudspeakers; and recording an acoustic signal from a user by the array of microphones using the respective calibration filter generated for each of the array of microphones, each of the array of microphones using the respective calibration filter recording essentially the same spectrum of the acoustic signal.

15. The computer program product as in claim 14, wherein generating the respective power-spectral density for each microphone of the array of microphones and each loudspeaker of the array of loudspeakers includes:

generating a respective impulse response function for that microphone and loudspeaker based on the respective reverberant sound field generated by that loudspeaker and received at that microphone.

16. The computer program product as in claim 15, wherein generating the respective power-spectral density for each microphone of the array of microphones and each loudspeaker of the array of loudspeakers further includes:

performing an autocorrelation of the respective impulse response function for that microphone and loudspeaker to produce an autocorrelated impulse response function; and performing a transform to frequency space on the autocorrelated impulse response function to produce the respective power-spectral density for that microphone and loudspeaker.

17. The computer program product as in claim 16, wherein performing the transform to frequency space on the autocorrelated impulse response function includes:

generating a window function that is equal to a constant within a specified time interval and zero outside of the specified time interval; and performing a Fourier transform operation on a product of the window function and the autocorrelated impulse response function.

18. The computer program product as in claim 15, wherein the method further comprises, prior to generating the respective impulse response function:

generating, at that loudspeaker as the audio signal, a swept sine chirp signal having frequencies between a first frequency and a second frequency, the swept sine chirp signal being received at that microphone.

19. The computer program product as in claim 15, wherein generating the respective impulse response function includes:

for each microphone of the array of microphones and each loudspeaker of the array of loudspeakers:

measuring a respective raw impulse response function corresponding to that microphone and that loudspeaker; and generating a time-dependent energy metric associated with that raw impulse response function;

generating a normalization factor based on an average, over the array of microphones and the array of loudspeakers, of respective time-dependent energy metrics associated with each microphone of the array of microphones and each loudspeaker of the array of loudspeakers; and dividing the respective raw impulse response function corresponding to each microphone of the array of microphones and each loudspeaker of the array of loudspeakers by the normalization factor to produce a decay-normalized impulse response function corresponding to that microphone and that loudspeaker.

20. An electronic apparatus, the electronic apparatus comprising:

memory; and controlling circuitry coupled to the memory, the controlling circuitry being configured to:

receive, via each microphone of an array of microphones, a respective reverberant sound field based on an audio signal generated by each loudspeaker of an array of loudspeakers;

generate, for each microphone of the array of microphones and each loudspeaker of the array of loudspeakers, a respective power spectral density for that microphone and that loudspeaker based on the respective reverberant sound field generated by that loudspeaker and received at that microphone;

generate, for each microphone of the array of microphones, a respective calibration filter as a ratio of a power spectral density averaged over the array of loudspeakers and the array of microphones and a power spectral density averaged over the array of loudspeakers; and record an acoustic signal from a user by the array of microphones using the respective calibration filter generated for each of the array of microphones, each of the array of microphones using the respective calibration filter recording essentially the same spectrum of the acoustic signal.

21. The electronic apparatus as in claim 20, wherein the controlling circuitry configured to generate the respective power-spectral density for each microphone of the array of microphones and each loudspeaker of the array of loudspeakers is further configured to:

generate a respective impulse response function for that microphone and loudspeaker based on the respective reverberant sound field generated by that loudspeaker and received at that microphone.

* * * * *